(12) United States Patent  
Furutani

(10) Patent No.: US 8,294,830 B2  
(45) Date of Patent: Oct. 23, 2012

(54) BROADCAST RECEPTION DEVICE AND METHOD FOR RENEWING CHANNEL INFORMATION IN BROADCAST RECEPTION DEVICE

(75) Inventor: Senichi Furutani, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1231 days.

(21) Appl. No.: 11/819,314

(22) Filed: Jun. 26, 2007

(65) Prior Publication Data

US 2007/0297343 A1 Dec. 27, 2007

(30) Foreign Application Priority Data

Jun. 26, 2006 (JP) ................................. 2006-175422

(51) Int. Cl.
*H04N 5/50* (2006.01)
*H04N 5/445* (2011.01)
*H04B 1/18* (2006.01)

(52) U.S. Cl. ..................... 348/732; 348/570; 455/154.1; 455/186.1; 725/38

(58) Field of Classification Search .................. 348/569, 348/570, 731, 732; 725/38, 50; 455/154.1, 455/186.1
See application file for complete search history.

(56) References Cited

U.S. PATENT DOCUMENTS

| | | | |
|---|---|---|---|
| 4,584,716 A | 4/1986 | Drentea | |
| 6,181,921 B1 * | 1/2001 | Konisi et al. | ............... 455/186.2 |
| 6,249,322 B1 | 6/2001 | Sugihara | |
| 6,340,997 B1 * | 1/2002 | Borseth | ........................ 348/731 |
| 6,359,580 B1 * | 3/2002 | Morrison | ....................... 348/731 |
| 6,728,522 B1 * | 4/2004 | Marrah et al. | ............. 455/179.1 |
| 6,744,477 B2 * | 6/2004 | Meersseman | .................. 348/731 |
| 6,785,904 B1 * | 8/2004 | Franken et al. | .................. 725/54 |
| 6,993,782 B1 * | 1/2006 | Newberry et al. | ............... 725/39 |
| 7,106,382 B2 * | 9/2006 | Shiotsu | ......................... 348/555 |
| 7,174,186 B2 * | 2/2007 | Onodera | ....................... 455/525 |
| 7,209,632 B2 * | 4/2007 | Nono | ............................ 386/243 |
| 7,372,405 B2 * | 5/2008 | Rabinowitz et al. | .......... 342/458 |
| 7,508,458 B2 * | 3/2009 | Matsuo | ......................... 348/725 |
| 7,561,213 B2 * | 7/2009 | Okamoto | ...................... 348/725 |
| 7,639,310 B2 * | 12/2009 | Kang | ............................ 348/731 |
| 7,733,270 B1 * | 6/2010 | Rabinowitz et al. | .......... 342/464 |

(Continued)

FOREIGN PATENT DOCUMENTS

EP 1 014 714 A1 6/2000

(Continued)

OTHER PUBLICATIONS

European Office Action dated Mar. 22, 2011 (Five (5) pages).

(Continued)

*Primary Examiner* — Brian Yenke

(74) *Attorney, Agent, or Firm* — Crowell & Moring LLP

(57) ABSTRACT

A broadcast receiving device comprising: a memory unit for storing a receivable channel information; a determination-information acquiring unit for acquiring determination information to identify a predetermined transmission condition of the transmission path; a determining unit for determining whether the transmission condition has varied, based on the determination information acquired by the determination-information acquiring unit; a detecting unit for detecting a channel of broadcasting signals which are receivable, by conducting an automatic scanning when the determining unit determines that the transmission condition of the transmission path has varied; and a renewing unit for renewing the channel information stored in the channel memory unit, based on a detected result obtained by the detecting unit.

6 Claims, 10 Drawing Sheets

U.S. PATENT DOCUMENTS

| | | | |
|---|---|---|---|
| 7,784,074 B2* | 8/2010 | Chozui | 725/50 |
| 7,808,562 B2* | 10/2010 | Yen | 348/732 |
| 2002/0186327 A1* | 12/2002 | Inui et al. | 348/732 |
| 2003/0098929 A1* | 5/2003 | Nono | 348/731 |
| 2003/0186662 A1 | 10/2003 | Himmel et al. | |
| 2003/0228857 A1* | 12/2003 | Maeki | 455/278.1 |
| 2004/0036772 A1* | 2/2004 | Pugel et al. | 348/180 |
| 2004/0061807 A1* | 4/2004 | Song | 348/731 |
| 2004/0105031 A1* | 6/2004 | Shibusawa | 348/570 |
| 2004/0198282 A1 | 10/2004 | Heiderscheit et al. | |
| 2004/0207764 A1 | 10/2004 | Naoi et al. | |
| 2005/0034173 A1* | 2/2005 | Hatanaka | 725/151 |
| 2005/0117070 A1* | 6/2005 | Wu et al. | 348/725 |
| 2005/0122429 A1 | 6/2005 | Katsube et al. | |
| 2005/0287968 A1* | 12/2005 | Takagi et al. | 455/179.1 |
| 2005/0289625 A1 | 12/2005 | Takagi et al. | |
| 2006/0020987 A1* | 1/2006 | Onomatsu et al. | 725/100 |
| 2006/0020997 A1* | 1/2006 | Onomatsu et al. | 725/134 |
| 2006/0038923 A1* | 2/2006 | Dinwiddie | 348/569 |
| 2006/0230429 A1* | 10/2006 | Van Horck | 725/135 |
| 2007/0060082 A1 | 3/2007 | Okumura et al. | |

FOREIGN PATENT DOCUMENTS

| | | |
|---|---|---|
| EP | 1 608 149 A2 | 12/2005 |
| JP | 2001-16524 A | 1/2001 |
| JP | 2005-5894 A | 1/2005 |
| JP | 2006-14060 A | 1/2006 |
| JP | 2006-41751 A | 2/2006 |
| JP | 2006-67358 A | 3/2006 |
| WO | WO 98/15118 A1 | 4/1998 |

OTHER PUBLICATIONS

Japanese Office Action dated Apr. 15, 2008 w/English translation (five (5) pages).

European Search Report dated Sep. 14, 2007 (Nine (9) Pages).

* cited by examiner

FIG.2A

FIRST TIME TABLE

| CHANNEL [CH] | FREQUENCY [MHz] | RECEPTION YES/NO | SEARCH CHANNEL |
|---|---|---|---|
| 1 | ... | YES | |
| 2 | ... | YES | |
| 3 | ... | NO | |
| 4 | ... | YES | |
| 5 | ... | NO | |
| 6 | ... | NO | |
| ... | ... | ... | ... |
| 62 | ... | YES | |

FIG.2B

SECOND TIME TABLE

| CHANNEL [CH] | FREQUENCY [MHz] | RECEPTION YES/NO | SEARCH CHANNEL |
|---|---|---|---|
| 1 | ... | YES | |
| 2 | ... | YES | |
| 3 | ... | YES | YES |
| 4 | ... | YES | |
| 5 | ... | NO | YES |
| 6 | ... | YES | YES |
| ... | ... | ... | ... |
| 62 | ... | YES | |

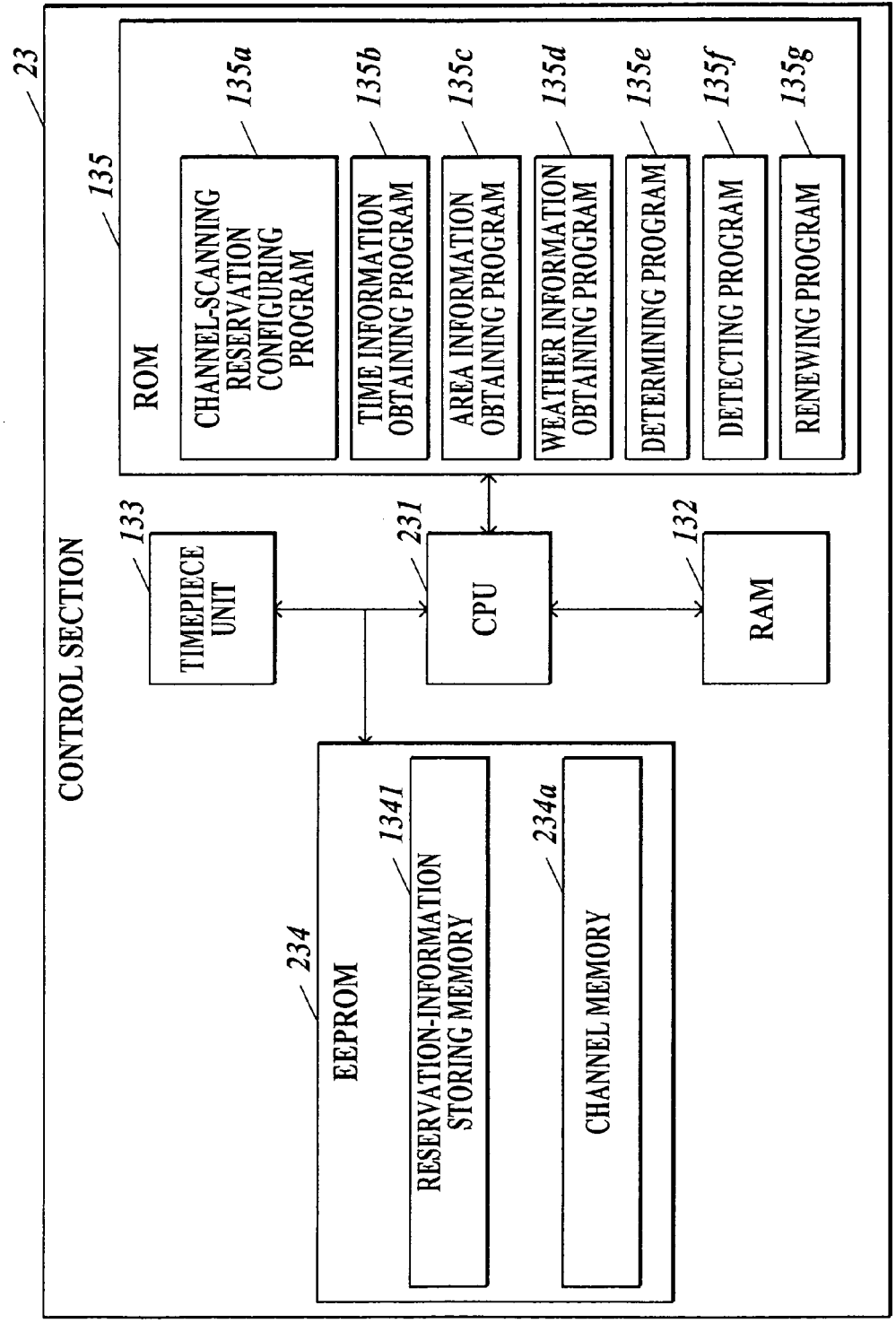

FIG.6

| CHANNEL MEMORY | | |
|---|---|---|
| CHANNEL [CH] | FREQUENCY [MHz] | RECEPTION YES/NO |
| 1 | ... | YES |
| 2 | ... | YES |
| 3 | ... | NO |
| 4 | ... | YES |
| 5 | ... | NO |
| 6 | ... | NO |
| ⋮ | ⋮ | ⋮ |
| 62 | ... | YES |

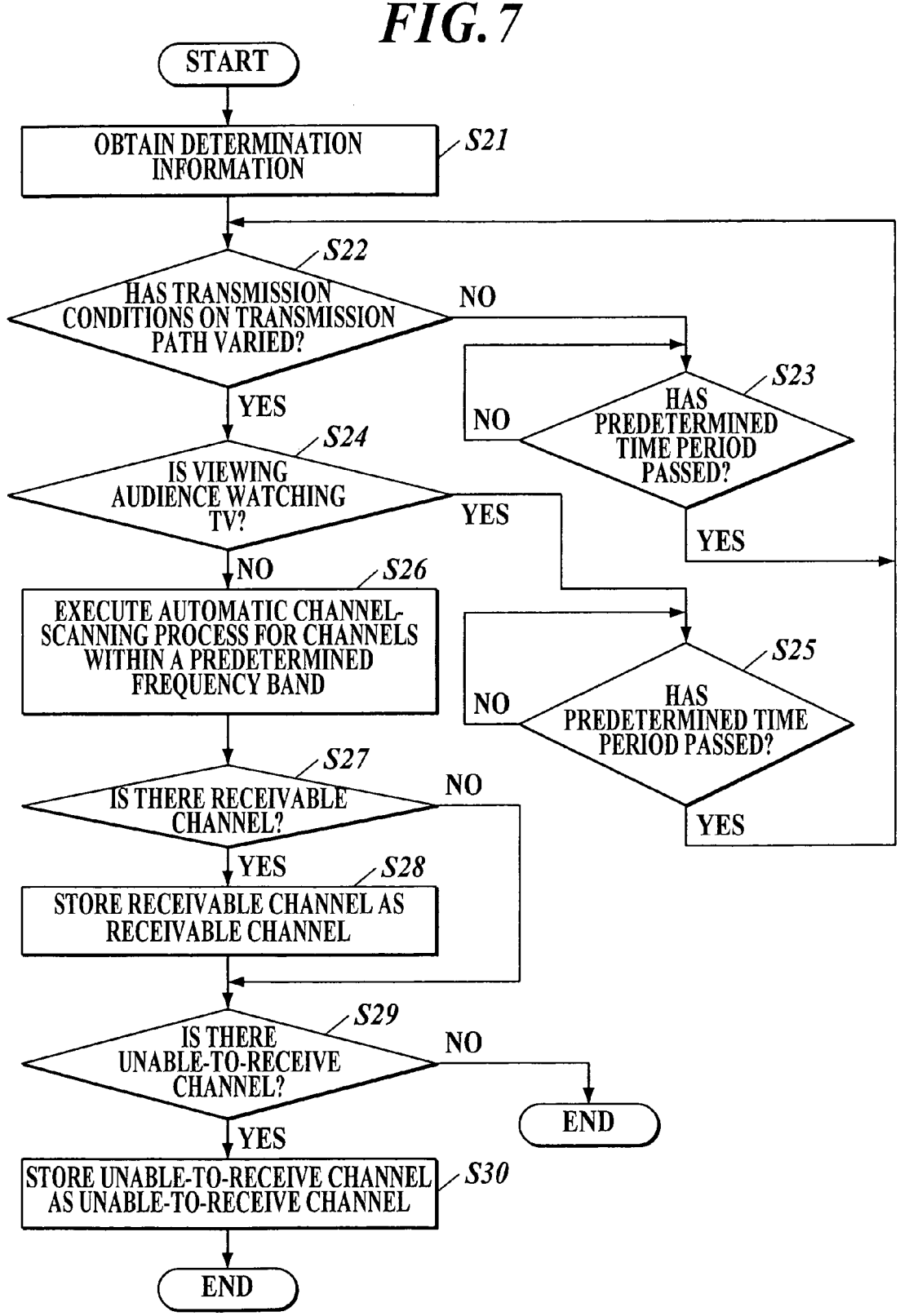

BROADCAST RECEPTION DEVICE AND METHOD FOR RENEWING CHANNEL INFORMATION IN BROADCAST RECEPTION DEVICE

BACKGROUND OF THE INVENTION

1. Field of the Invention

The present invention relates to a broadcast receiving device provided with a channel scanning function and a method for renewing channel information in the broadcast receiving device.

2. Description of the Related Art

A broadcast receiving device, which is provided with an automatic channel-scanning function for automatically detecting receivable channels when it is installed in a house after it has been purchased or after moving, has been known (see JP-WO98/15118: Patent Document 1; and JP2001-16524A: Patent Document 2). In conducting such an automatic channel scanning function, a tuner is made to tune in on channels one by one for detection of broadcast signals, and detected channels in which a broadcast signal exists and frequency data of those channels are coordinately stored in a channel memory as a receivable channel.

Also, another television broadcast receiving device is disclosed, for example, in JP 2006-41751A (Patent Document 3), in which new channel information to be registered for a channel newly detected as a tunable channel is added to a channel information table with the registered channel information on channels already registered as tunable channels being retained as it is so that the already-registered channels are prevented from being treated as un-tunable channels when a new channel scanning process is conducted.

In general, intensity of a television-broadcasting signal, i.e. a transmission condition of a transmission path, varies depending on a receiving time slot of day, a location where a television-broadcast receiving device is installed, and a weather condition, as the transmission condition is subject to the influence of those factors. Therefore, as the tunable channels and un-tunable channels may sometimes alter in response to the condition of those factors. When the channel scanning processing is conducted, as disclosed in the Patent Documents 1, 2, and 3, without considering changes of the transmission conditions in the transmission path, un-tunable channels may occur in spite of the fact that they are registered in the channel data as tunable channels. This generates a problem in that the usability or user-friendliness of the television broadcast receiving device will be deteriorated.

SUMMARY OF THE INVENTION

An object of the present invention is to provide a method for renewing the channel information in a television broadcast receiving device, so that it can provide the television broadcast receiving device with an improved usability, and in which the channel scanning processing is conducted in more suitable timing depending on the transmission condition of the transmission path.

In order to solve the above problem, according to a first aspect of the present invention, the broadcast receiving device comprises: a memory unit for storing a receivable channel information for each of a predetermined transmission condition of a transmission path which transmits broadcasting signals; a channel memory unit for storing a predetermined channel for each of the predetermined transmission condition; a determination-information acquiring unit for acquiring determination information to identify the predetermined transmission condition of the transmission path; a determining unit for determining whether the transmission condition has varied, based on the determination information acquired by the determination-information acquiring unit; a detecting unit for detecting a channel of broadcasting signals which are receivable, by conducting an automatic scanning only for the predetermined channel which corresponds to the respective transmission condition of the transmission path and which is stored in the channel memory unit when the determining unit determines that the transmission condition of the transmission path has varied; and a renewing unit for renewing the channel information corresponding to the transmission condition of the transmission path stored in the channel memory unit, based on a detected result obtained by the detecting unit, wherein the determination information includes time information, area information, and weather information; and the determining unit determines that the transmission condition has varied when a time based on time information acquired by the determination-information acquiring unit has become a time previously set, when an area based on area information acquired by the determination-information acquiring unit has varied from one area to another area, or when weather based on weather information acquired by the determination-information acquiring unit has varied from one weather condition to another weather condition.

In accordance with the first aspect of the present invention, the memory unit stores channel information on receivable channels for each of predetermined transmission conditions of a transmission paths, and the channel memory unit stores predetermined channels for each of the predetermined transmission conditions of the transmission paths. The determination-information acquiring unit acquires determining information for determining the predetermined transmission conditions of the transmission paths that transmit broadcasting signals, and the determining unit determines, based on the determining information acquired by the determination information acquiring unit, whether the transmission conditions of the transmission paths have varied. The detecting unit conducts an automatic channel scanning process only for the predetermined channels corresponding to transmission conditions stored in the channel memory unit, and detects channels of which broadcasting signal is receivable; and the renewing unit renews the channel information that corresponds to the transmission conditions of the transmission paths and stored in the memory unit. The determination information includes time information, area information, and weather information; and the determining unit determines that the transmission condition has varied when a time of day based on time information acquired by the determination-information acquiring unit has become a time previously configured, an area based on the area information acquired by the determination-information acquiring unit has varied from one area to another area, and weather based on the weather information acquired by the determination-information acquiring unit has varied from one weather condition to another weather condition.

Accordingly, the channel scanning process is to be conducted only when the transmission conditions have varied, that is, when the time of day has become the predetermined time previously configured, the location of the television receiver has varied from one place to another place, and the weather has varied from one weather condition to another weather condition. That is, the channel scanning process is to be conducted only when the transmission conditions of the transmission paths have changed and, therefore, the channel scanning process can be conducted in more appropriate timing corresponding to the transmission conditions of the transmission path. Accordingly, the present invention can provide a broadcast receiving device with an improved usability. Further, as the time period necessary for the channel scanning process may be shortened in the case that the channel scanning process is conducted only for the channel whose receivability is different depending on the transmission condition, the channel scanning process can be conducted more efficiently.

In accordance with a second aspect of the present invention, the broadcast receiving device comprises: a memory unit for storing a receivable channel information; a determination-information acquiring unit for acquiring determination information to identify a predetermined transmission condition of the transmission path; a determining unit for determining whether the transmission condition has varied, based on the determination information acquired by the determination-information acquiring unit; a detecting unit for detecting a channel of broadcasting signals which are receivable, by conducting an automatic scanning when the determining unit determines that the transmission condition of the transmission path has varied; and a renewing unit for renewing the channel information stored in the channel memory unit, based on a detected result obtained by the detecting unit.

According to the second aspect of the present invention, the memory unit stores channel information-on a receivable channels, the determination-information acquiring unit acquires determination information for determining a predetermined transmission conditions of a transmission path that transmitting a broadcasting signal, and the determining unit determines, based on the determination information acquired by the determination-information acquiring unit, whether or not the transmission conditions of the transmission path have varied. The detecting unit conducts a automatic scanning process for detecting a channel of which broadcasting signal is receivable, and the renewing unit renews, based on a detected result obtained by the detecting unit, the channel information stored in the memory unit.

Accordingly, the channel scanning processing is to be conducted only when the transmission conditions have varied, and, therefore, the channel scanning process can be conducted in more appropriate timing corresponding to the transmission conditions of the transmission paths. Hence, the present invention can provide a broadcast-receiving device with an improved usability.

In accordance with a third aspect of the present invention, the broadcast receiving device comprises: a memory unit for storing a receivable channel information corresponding to a predetermined transmission condition of a transmission path which transmits broadcasting signals; a determination-information acquiring unit for acquiring determination information to identify the predetermined transmission condition of the transmission path; a determining unit for determining whether the transmission condition has varied, based on the determination information acquired by the determination-information acquiring unit; a detecting unit for detecting a channel of broadcasting signals which are receivable, by conducting an automatic scanning when the determining unit determines that the transmission condition of the transmission path has varied; and a renewing unit for renewing the channel information corresponding to the transmission condition of the transmission path stored in the channel memory unit, based on a detected result obtained by the detecting unit.

According to the third aspect of the present invention, the memory unit stores channel information on receivable channels in association with predetermined transmission conditions of a transmission path that transmit a broadcasting signal, a determination-information acquiring unit acquires determination information for determining the predetermined transmission conditions of a transmission path that transmits a broadcasting signal, and the determining unit determines, based on the determination information acquired by the determination-information acquiring unit, whether or not the transmission conditions of the transmission path has varied. The detecting unit conducts a automatic scanning process for detecting a channel of which broadcasting signal is receivable, and a renewing unit renews, based on a detected result obtained by the detecting unit, the channel information stored in the memory unit.

Accordingly, the channel scanning process is to be conducted only when the transmission conditions have varied, and, therefore, the channel scanning process can be conducted in more appropriate timing corresponding to the transmission conditions of the transmission path. Hence, the present invention can provide a broadcast receiving device with an improved usability.

In the broadcast receiving device of the second or third aspect of the invention, preferably, the determination information includes time information; and the determining unit determines that the transmission condition has varied when a time based on the time information acquired by the determination-information acquiring unit has become a time previously set.

Accordingly, it can provide other advantages in addition to those advantages obtained by the second or third aspects of the invention. The determination information includes time information, and the determining unit determines, when a time, based on the time information acquired by the determination-information acquiring unit, has become a time previously configured that a transmission condition of a transmission path has varied. Accordingly, the channel scanning processing is to be conducted only when the transmission conditions have varied and therefore, the channel scanning processing can be conducted in more appropriate timing corresponding to the transmission condition of the transmission path.

Preferably, the determination information includes area information; and the determining unit determines that the transmission condition has varied when an area based on the area information acquired by the determination-information acquiring unit has varied from one area to another area.

Accordingly, because the determination information includes area information and the determining unit determines, when an area based on the area information acquired by a determination-information acquiring unit has varied from one place to another place, that the transmission condition of a transmission path has varied, the channel scanning processing is to be conducted only when the transmission condition of the transmission path has changed as a location of a broadcast receiving device has varied from one place to another place, and therefore the channel scanning process can be more appropriately conducted in response to the transmission condition of the transmission path.

Preferably, the determination information includes weather information; and the determining unit determines that the transmission condition has varied when a weather condition based on the weather information acquired by the determination-information acquiring unit, has varied from one weather condition to another weather condition.

According to such a broadcast receiving device, because the determination information includes weather information, and the determining unit determines, when the weather based on the weather information acquired by the determination-information acquiring unit has varied from one weather condition to another weather condition, that a transmission condition of a transmission path has varied.

Accordingly, a channel scanning processing is to be conducted only when the transmission condition of the transmission path has changed as the weather has varied from one weather condition to another weather condition, and, therefore, the channel scanning process can be more appropriately conducted in response to the transmission condition of the transmission path.

In accordance with a fourth aspect of the present invention, the method for renewing channel information in a broadcast receiving device which comprises a memory unit for storing information on a receivable channel, comprises: a determination-information acquiring step for acquiring determination information to identify a predetermined transmission condition in a transmission path that transmits a broadcasting signal; a determining step for determining, based on determination information acquired by the determination-information acquiring step, whether or not the transmission condition has varied; a detecting step for detecting a channel of broadcasting signals which are receivable, by conducting an automatic scanning when the determining step determines that the transmission conditions of the transmission path have varied; and a renewing step for renewing the channel information stored in the memory unit, based on a detected result obtained by the detecting step.

According to the fourth aspect of the present invention, in the broadcast receiving device provided with the memory unit that stores channel information on receivable channels; by the determination-information acquiring step, determination information for determining predetermined transmission conditions of a transmission path is acquired; by the determining step, whether the transmission conditions of the transmission path have varied is determined, based on the determination information acquired by the determination-information acquiring step; by the detecting step, an automatic channel scanning is conducted when the determining step determines that the transmission conditions have varied, and receivable channels are detected; and, by the renewing step, the information on the receivable channels stored in the memory unit is renewed based on the detected result obtained by the detecting step.

Accordingly, the present invention can provide a method for renewing information on the receivable channels in a broadcast receiving device, wherein a channel scanning processing is to be conducted only when the transmission conditions of the transmission path have changed and therefore the channel scanning process can be conducted in more suitable timing in response to the transmission conditions of the transmission path.

In accordance with a fifth aspect of the present invention, the method for renewing channel information in a broadcast receiving device which comprises a memory unit for storing a receivable channel information corresponding to a predetermined transmission condition of a transmission path which transmits broadcasting signals, comprises: a determination-information acquiring step for acquiring determination information to identify the predetermined transmission condition of the transmission path; a determining step for determining whether the transmission condition has varied, based on the determination information acquired by the determination-information acquiring unit; a detecting step for detecting a channel of broadcasting signals which are receivable, by conducting an automatic scanning when the determining unit determines that the transmission condition of the transmission path has varied; and a renewing step for renewing the channel information corresponding to the transmission condition of the transmission path stored in the channel memory unit, based on a detected result obtained by the detecting unit.

According to the fifth aspect of the present invention, in a broadcast receiving device including a memory unit which stores channel information on a receivable channel in association with predetermined transmission conditions of a transmission path that transmits a broadcasting signal; by the determination-information acquiring step, determination information for determining predetermined transmission conditions of a transmission path is acquired; by the determining step, whether the transmission conditions of the transmission path have varied is determined, based on the determination information acquired by the determination-information acquiring step; by the detecting step, an automatic (channel) scanning is conducted when the determining step determines that the transmission conditions have varied, and receivable channels are detected; and by the renewing step, the information on the receivable channels stored in the memory unit are renewed based on a detected result obtained by the detecting step.

Accordingly, the invention can provide a method for renewing information on the receivable channels in a broadcast receiving device, wherein a channel scanning processing is to be conducted only when the transmission conditions of the transmission path have changed and therefore a channel scanning process can be conducted in more suitable-timing in response to the transmission conditions of the transmission path.

BRIEF DESCRIPTION OF THE DRAWINGS

FIGS. 2A and 2B illustrate examples of a first time table and a second time table, respectively;

FIGS. 5A and 5B are block diagrams showing the main construction of the second embodiment of a television receiver according to the invention;

FIG. 6 is a view showing an example of a channel memory; and

FIG. 7 is a flowchart showing a channel-scan processing conducted by a CPU in the second embodiment.

DETAILED DESCRIPTION OF THE PREFERRED EMBODIMENTS

Figure 1A:
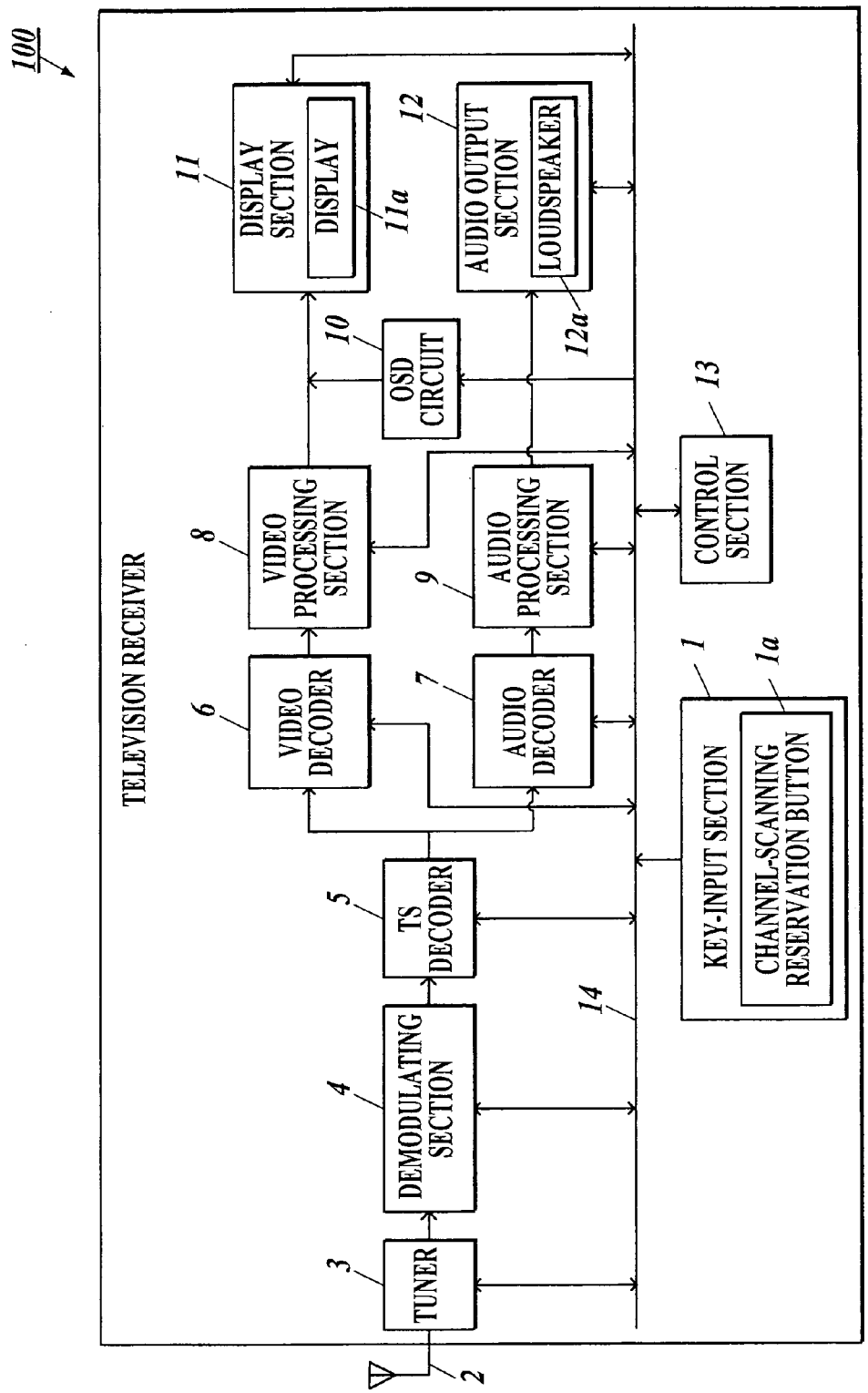
FIGS. 1A and 1B are block diagrams showing the main construction of a first embodiment of a television receiver, according to the present invention.

The preferred embodiments of the invention will be explained in detail hereinafter with reference to the drawings attached herewith. It should be noted, however, that the scope of the invention is not limited to those exemplified in the drawings.

The First Embodiment

Figure 1B:
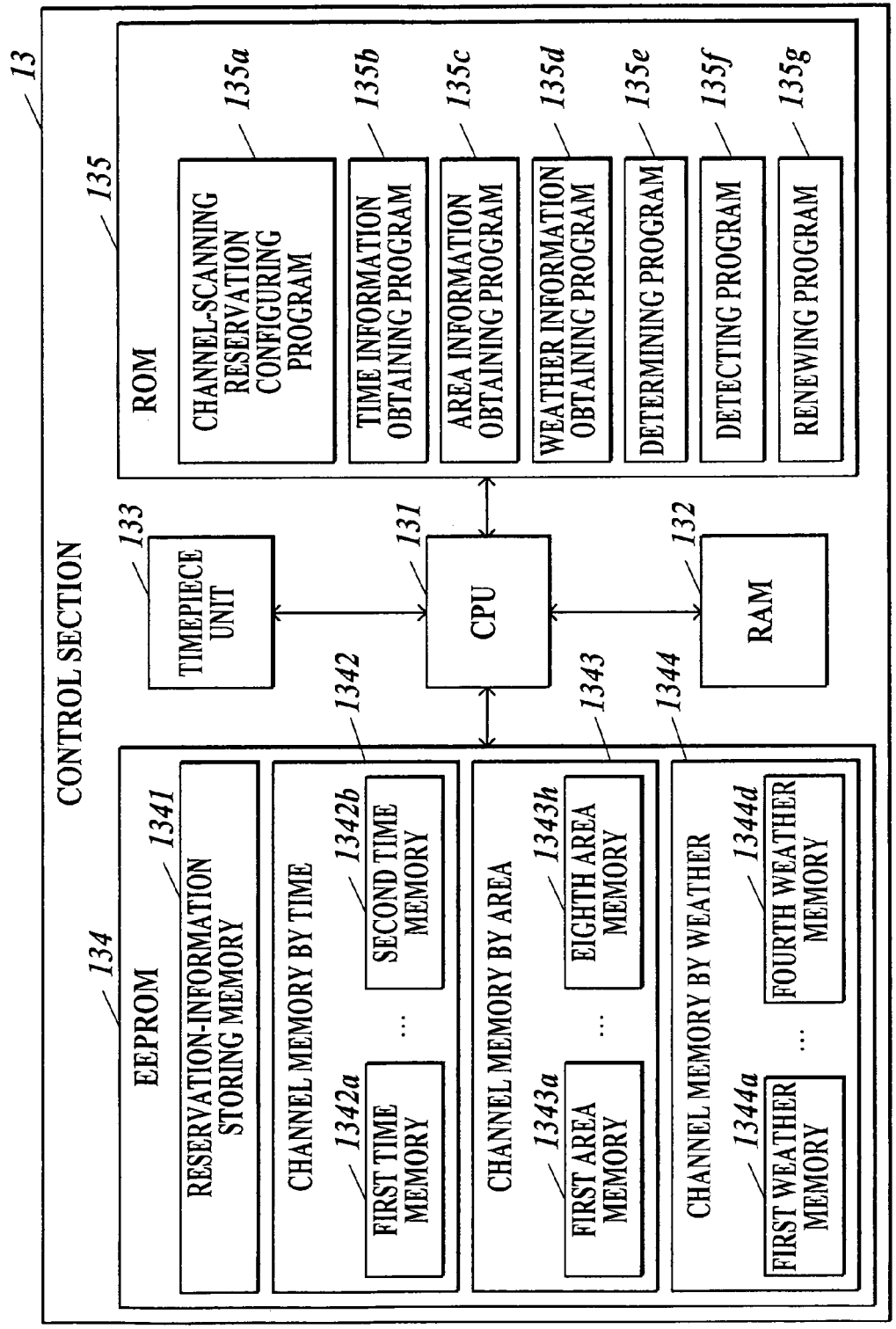

In FIGS. 1A and 1B, a television receiver 100 according to the first embodiment of the present invention will be explained as a broadcast receiving device for receiving television broadcasting programs.

The television receiver 100 in the first embodiment of the present invention is provided with an automatic channel-scanning function. The automatic channel-scanning process is a process for automatically detecting whether broadcasting signals in respective channels can be received, by changing over the channels in a predetermined frequency band one by one in a tuner 3.

However, as a transmission condition in a transmission path changes in response to the time slot of a day, a location where the television receiver 100 is installed, and a weather condition, receivable channels may sometimes alter to unreceivable channels depending on the time slot of a day, the location of the television receiver 100, and the weather condition. Therefore, in the television receiver 100 according to the invention, the channel scanning process is conducted only when either of the time, the area, and the weather has varied, that is, the transmission condition of the transmission path has varied, so that the channel scanning process can be done in more suitable timing.

Further, in the television receiver 100, which is an embodiment of the present invention, channel information, that is, the information on the channels receivable in the respective time slots, respective areas, and respective weather conditions (i.e. the channel information corresponding to the transmission condition), is stored separately and independently for the time slot, the area, and the weather; and, in the channel scanning process, only the channels that are previously identified as "uncertain channels" are subject to the channel scanning process as the channels to be searched. Here, the "uncertain channels" means that the channels of which receivabilities are uncertain under the transmission conditions of the transmission path when the channel scanning process is conducted.

Therefore, the television receiver 100 according to the invention can effectively conduct the channel scanning process.

FIGS. 1A and 1B are block diagrams showing the main construction of a first embodiment of a television receiver 100, according to the present invention.

As shown in FIGS. 1A and 1B, the television receiver 100 includes: a key input section as an input means through which a user can remotely input various instructions to the television receiver 100; an antenna 2 for receiving broadcasting signals; a tuner 3 for tuning in a broadcasting signal within a predetermined channel from among broadcasting signals received by the antenna 2; a demodulating section 4 for demodulating the broadcasting signal tuned in by the tuner 3; a TS decoder 5 for separating the broadcasting signal demodulated by the demodulating section 4 into a plurality of streams; a video decoder 6 and audio decoder 7 for decoding the broadcasting signal separated by the TS decoder 5; a video processing section 8 for conducting a predetermined process for a video signal decoded by the video decoder 6; an audio processing section 9 for conducting a predetermined process for an audio signal decoded by the audio decoder 7; an OSD circuit 10 for adding OSD data to the video signal processed by the video processing section 8; a display section 11 for outputting the video signal processed by the video processing section 8; an audio output section 12 for outputting the audio signal processed by the audio processing section 9; and a control section 13 for totally controlling the operation of the television receiver 100; and these components, sections, and units are connected to each other through a bus line 14.

The key input section 1 is, for example, a remote controller having a plurality of keys and when a key is depressed an input operation signal that corresponds to the depressed key is outputted to the control section 13.

Specifically, the key input section 1 is provided with a channel-scanning reservation button 1a, and outputs the input operation signal for giving instructions to the control section 13 to display a reservation configuring screen G1 for configuring a reservation of the channel scanning process in response to the depression of the channel-scanning reservation button 1a.

The antenna 2 is disposed toward in a predetermined direction in the outdoors, and receives television broadcasting signals (RF signals) of a high frequency (RF) transmitted from television broadcasting stations (not shown).

The tuner 3 comprises, for example, an RF amplifying circuit, and a frequency conversion circuit consisting of a local oscillation circuit and a mixing circuit, though all those components are omitted in the drawing. The tuner 3 amplifies, by the RF amplifying circuit, the television broadcasting signal that is inputted from the antenna 2, and mixes it in the mixing circuit with a local oscillation signal outputted from the local oscillation circuit. The tuner 3 further receives an intermediate frequency signal (an IF signal) in a specific frequency band in response to an control output from the control section 13 for tuning in on a specific broadcasting signal, and, after conducting a predetermined process to the intermediate frequency signal, outputs it to the demodulating section 4.

In the execution of a detecting program 135f which will be explained later, the tuner 3 conducts, based on the control signal from the control section 13, a channel scanning process for detecting which channel of the broadcasting signal in a predetermined frequency band is receivable. Determination as to whether or not a broadcasting signal is receivable is made in the following fashion. For example, if a BER (Bit Error Rate) measured when the television receiver 100 is tuned in on a specific frequency in a channel is lower than a predetermined threshold, the specific frequency is determined receivable. The detected result obtained by the channel scanning process conducted in the tuner 3 is outputted to the control section 13.

The demodulating section 4 conducts, for example, processes for digitally demodulating the intermediate frequency signal outputted from the tuner 3 and correcting errors, in accordance with the instructions from the control section 13; produces transport (TS) streams; and outputs them to the TS decoder 5.

The TS decoder 5 separates the transport streams inputted from the demodulating section 4 into a video stream complying with the MPEG 2 (Moving Picture Experts Group 2) standard, an audio stream, and a data stream such as PHI/SI (Program Specific Information/Service Information); and supplies the video stream to the video decoder 6, the audio stream to the audio decoder 7, and the data stream such as the PSI/SI to the control section 13.

In the data stream, various information such as time information, area information, and weather information is included. When a time-information acquiring program 135b, an area-information acquiring program 135c, and a weather-information acquiring program 135d, all of which will be explained later, are executed, various information is extracted from the data stream inputted from the TS decoder 5, and the present time of day, the area where the television receiver 100 is situated, and the present weather condition are identified accordingly.

The video decoder 6 decodes the video stream inputted from the TS decoder 5 and produces video data by performing inverse Discrete Cosine Transform (iDCT) and motion-compensation control, and outputs the data to the video processing section 8. The audio decoder 7 decodes the audio stream inputted from the TS decoder 5, produces audio data, and outputs the data to the audio processing section 9.

The video-processing section 8 conducts various processes, such as D/A conversion, for the video data inputted from the video decoder 6, and produces a video signal. The audio processing section 9 conducts various processes, such as D/A conversion, for the audio data inputted from the audio decoder 7, and produces an audio signal. The produced video signal is outputted to the display section 11, and the audio signal is outputted to the audio output section 12.

The OSD circuit 10 conducts a process to combine OSD data (not shown) stored in a ROM 135 with the video signal outputted from the video processing section 8.

The display section 11 is provided with a display 11a, such as an LCD (Liquid Crystal Display), a PDP (Plasma Display Panel), and so on, and displays picture images, that are based on the video signals inputted from the video processing section 8, on the display 11a. The audio output section is provided with, for example, a speaker 12a, and outputs audio sounds, that are based on the audio signals inputted from the audio processing section 9, from the loudspeaker 12a.

The control section 13 comprises such as a CPU (Central Processing Unit) 131, a RAM (Random Access Memory) 132, a timepiece unit 133, an EEPROM (Electronically Erasable and Programmable Read Only Memory) 134, and ROM (Read Only Memory) 135.

The CPU 131 executes various programs stored in the ROM 135 in response to input signals inputted from each part of the television receiver 100, and totally controls the overall operation of the television 100 by outputting output signals, that are based on the execution of the various programs, to each part of the television receiver 100.

The RAM 132 is used as a work area of the CPU 100, and temporarily stores processed results produced when the programs are executed by the CPU 131, and inputted data.

The timepiece unit 133 is provided with, for example, a timepiece circuit, and specifically, keeps the time of day. The timepiece unit 133 outputs time data to the CPU 131 at a predetermined timing under the control of the CPU 131.

The EEPROM 134 is, for example, a re-writable semiconductor, and specifically, includes such as a reservation-information storing memory 1341, a channel memory by time 1342, a channel memory by area 1343, and a channel memory by weather 1344.

The reservation-information storing memory 1341 stores items (i.e. "Time", "Area", and "weather") selected by the user when a channel-scanning reservation configuring program 135a, which will be explained later, is executed and, as a result, a reservation configuring screen (picture image) G1 is displayed on the display 11a. In the case that the item "Time" is selected, the reservation-information storing memory 1341 further stores the configured times (e.g. the first time of day and the second time of a day) when the channel-scanning process is to be conducted. The information on "Time", "Area", and "weather" is stored in the reservation storing memory 1341 by user's operation of the remote controller, utilizing the reservation configuring screen (picture image) G1. Based on the stored information on "Time", "Area", and "weather", one or more programs among the time information acquiring program 135b, the area information acquiring program 135c, and the weather information acquiring program 135d, all of which will be explained later on, are executed, and determination information such as the time information, the area information, and the weather information can be obtained. The determination information thus obtained will be read out as needed when a determination program 135e, the detecting program 135f, and a renewing program 135g are executed.

The channel memory (by time) 1342 stores information on the receivable channels in the respective transmission conditions that vary depending on the time of day, and functions as a memory means.

Specifically, the channel memory (by time) 1342 is provided with, for example, two tables corresponding to two different times: one is the first time table 1342a and the other is the second time table 1342b. The first time table 1342a stores the channel information on the channels receivable at the first time of day (e.g. 6:00 a.m.), and the second time table stores the channel information on the channels receivable at the second time of day (e.g. 20:00 p.m.).

The first time table 1342a and the second time table 1342b provided in the channel memory (by time) 1342 are associated with the transmission conditions in the transmission path. That is, as the transmission condition varies depending on the time of day, the channels receivable at the different time of day are stored in a plurality of the time tables. The first time table 1342a and the second time table 1342b respectively store the channels receivable in the different transmission conditions depending on the time of day.

Further, the first time table 1342a and the second time table 1342b respectively and independently store "search channels" (predetermined channels) which are the channels identified as uncertain channels. Here, the "uncertain channels" means the channels which are uncertain whether they can be received or not at the predetermined time of day. The first and the second time tables respectively function as a channel memory means.

The channel memory (by area) 1343 stores, for example, information on the receivable channels in the respective transmission conditions that vary depending on the area where the television receiver 100 is situated, and functions as a memory means.

Specifically, the channel memory (by area) 1343 is, for example, provided with the first area table 1343a through the eighth area table 1343h that correspond to eight geographic areas. The first area table 1343a stores, for example, information on channels receivable in the first area (e.g. Hokkai-do area), and the eighth area table 1343h stores information on channels receivable in the eighth area (e.g. Kyushu and Okinawa area).

The first area table 1343a through the eighth area table 1343h provided in the channel memory (by area) 1343 are associated with the transmission conditions in the transmission path. That is, as the transmission condition in the transmission path varies depending on the geographic areas, the channels receivable at the different areas are stored in a plurality of the area tables. The first area table 1343a through the eighth area table 1343h respectively store the channels receivable in the different transmission conditions depending on the geographic area.

Further, the first area table 1343a through the eighth area table 1343h respectively and independently store "search channels" (predetermined channels) which are the channels identified as uncertain channels. Again, the "uncertain channels" means the channels which are uncertain whether they can be received or not in the predetermined geographic area. The first to eighth area tables respectively function as a channel memory means.

The channel memory (by weather) 1344 stores, for example, information on the receivable channels in the respective transmission conditions that vary depending on the weather, and functions as a memory means.

Specifically, the channel memory (by weather) 1344 is, for example, provided with the first weather table 1344a through the fourth weather table 1344d that correspond to four different weathers. The first weather table 1344a stores, for example, information on channels receivable in the condition of the first weather (e.g. fair weather), and the fourth weather table 1344d stores information on channels receivable in the condition of the fourth weather (e.g. rain weather). The first weather table 1344a through the fourth weather table 1344d provided in the channel memory (by weather) 1344 are associated with the transmission conditions in the transmission path. That is, as the transmission condition in the transmission path varies depending on the weather, the channels receivable in the different weather are stored in a plurality of the weather tables. The first weather table 1344a through the fourth weather table 1344d respectively store the channels receivable in the different transmission conditions depending on the weather.

Further, the first area table 1344a through the fourth area table 1344d respectively and independently store "search channels" (predetermined channels) which are the channels identified as uncertain channels. Again, the "uncertain channels" means the channels which are uncertain whether they can be received or not in the predetermined weather. The first to fourth weather tables respectively function as a channel memory means.

The above-explained search channels are those which are subject to search in the channel scanning process conducted by the execution of the detection program 135f, which will be explained later. The search channels are the channels previously identified as "the channels that are uncertain whether they are receivable or not in a certain transmission condition", based on accumulated information that has been obtained by conducting the channel scanning process for a plurality of times for all channels of predetermined frequencies in a plurality of different respective transmission conditions by the time of day, the geographic area, and the weather. Specifically, in the channel scanning process conducted for a channel for a plurality of times under a single transmission condition, if the detected result shows that the channel becomes both receivable and unreceivable, then the channel is identified as an "uncertain channel" that is uncertain whether it is receivable or not under that transmission condition. The channel scanning process is to be conducted for all channels until necessary and sufficient information for respective transmission conditions is accumulated and, as a result, the "search channels" are identified. The search channels are, once identified, separately and independently stored regardless of whether the search channels are receivable or not in the channel scanning process.

FIG. 2 exemplarily shows the first time table 1342a (FIG. 2A) and the second time table 1342b (FIG. 2B), both provided in the channel memory (by time) 1342. The first time table 1342a and the second time table 1342b are tables that store information on the receivable channels at different times of day. For example, the first time table 1342a stores information on the channel receivable at the first time of day (e.g. 6:00 a.m.), and the second time table 1342b stores information on the channel receivable at the second time of day (e.g. 20:00 p.m.). As shown in FIG. 2, The first time table 1342a and the second time table 1342b store broadcasting channels (physical channels) and frequency data of the channels identified by the channel scanning process, in association with each other. In the tables, an items "Reception Yes/No" which indicates that the reception of the channel is possible (i.e. Yes) or not (i.e. No), the receivable channels are stored as "Yes", and, on the other hand, the unreceivable channels are stored as "No". As shown in FIG. 2, in the case that the transmission condition at the second time of day is better than that at the first time of day, for example, the channels identified as unreceivable channels (e.g. the channels 3 and 6) at the first time of day, are stored as receivable channels at the second time of day.

The first time table 1342a and the second time table 1342b respectively and independently store the previously identified search channels as channels that are uncertain whether they are receivable or not at those predetermined times of day; and, for example, the search channels are not stored in the first time table 2342a, but "Channel 3", "Channel 5" and "Channel 6" are stored in the second time table 2342b. That is, the receivable-channel detecting process in the channel scanning process is not conducted at the first time of day, and that detecting process is to be conducted only for "Channel 3", "Channel 5" and "Channel 6".

The ROM 135 stores various default (initial configuration) values in addition to various data processing programs to be executed by the CPU 131. Specifically, the ROM 135 stores control programs, such as the channel-scanning reservation configuring program 135a, the time information acquiring program 135b, the area information acquiring program 135c, the weather information acquiring program 135d, the determining program 135e, and renewing program 135g, and so on.

The channel-scanning reservation configuring program 135a is, for example, a program for materializing, for the CPU 131, a function for configuring reservations of the automatic scanning of the channels. Specifically, the CPU 131 produces the reservation configuring screen (picture image) G1, when the input operation signal requiring display of the reservation configuring screen is inputted to the control section 13 in accordance with user's depressing operation to the channel-scanning reservation button 1a of the key input section 1. The CPU 131 then displays the produced the reservation configuring screen G1 on the display 11a of the display section 11.

Figure 3:
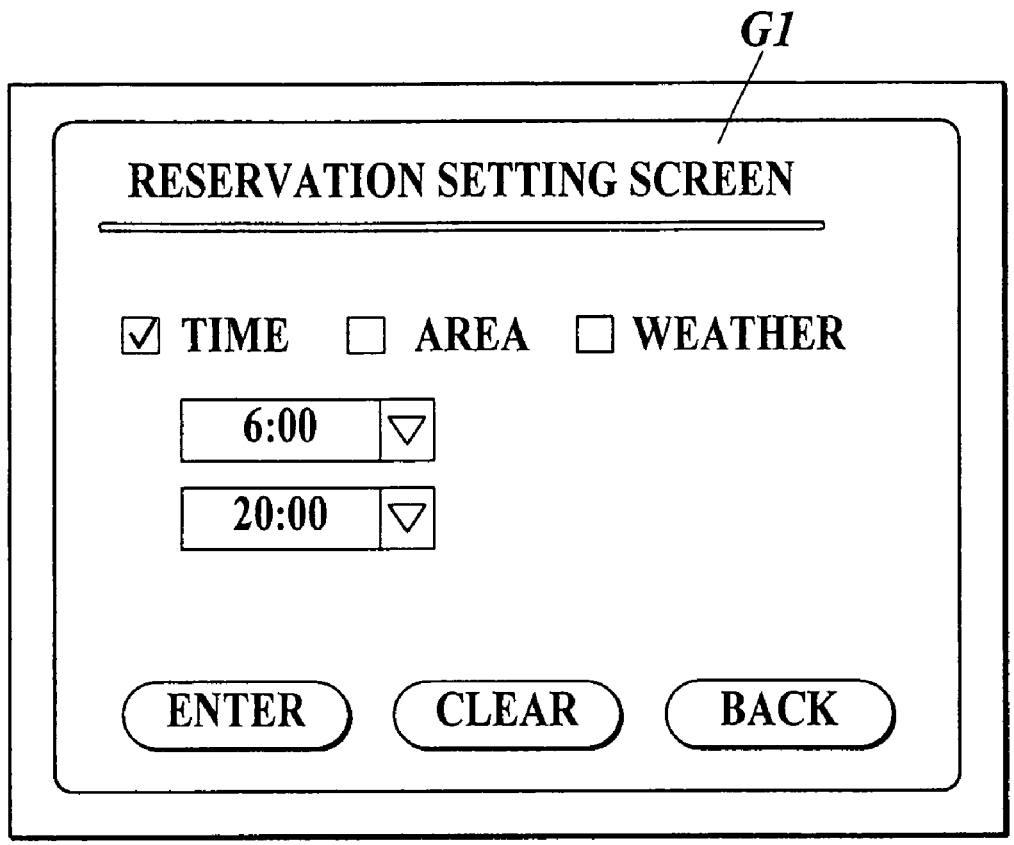
FIG. 3 illustrates an example of a reservation configuring screen displayed on a display section when a reservation configuring program for channel-scanning is executed.

FIG. 3 exemplarily shows the reservation configuring screen G1 which is displayed on the display section 11 when the channel-scanning reservation configuring program 135a is executed. As shown in FIG. 3, when one or more items are selected from among the items of "Time", "Area", and "Weather" on the reservation configuring screen G1, reservations for conducting the channel scanning process in response to the transmission conditions that vary by time, geographic area, or the weather are made and configured. Further, the item of "Time" is so designed that the times when the channel scanning process should be conducted (e.g. the first time of day and the second time of day) are configured through it. The CPU 131 stores, when the items of "Time", "Area", and "Weather", and the time at which the channel scanning process is conducted are selected by user's operation for the key input section 1, all selected information in the reservation-information storing memory 1341.

The reservation configuring screen G1 may be designed so that the unit of the divisional geographic area can be selected from among "an eight-regional unit", "a forty-seven administrative unit", and "a city/town-based unit". Here, an explanation will be made supposing that the "eight regional units" has been selected and, thus, the "Area" is divided into eight areas.

The time-information acquiring information 135b is a program for making the CPU 131 have a function to acquire the time information.

Specifically, the CPU 131 acquires the present time data, by making the timepiece 133 provide the present time of day, when the item of "Time" on the reservation configuring screen is selected by the user and a reservation for conducting the channel scanning process in response to the transmission condition by time is made and configured. The CPU 131 may acquire the present time data contained in the data stream. Thus, the CPU functions as the time data acquiring means by executing the time-information acquiring program 135b.

The area-information acquiring program 135c is, for example, a program for making the CPU have a function to acquire the area information.

Specifically, the CPU 131 acquires, in a predetermined timing (e.g. by every sixty seconds), the present area information contained in the data stream when the item "Area" on the reservation configuring screen is selected by the user and a reservation for conducting the channel scanning in response to the transmission condition by area is made and configured. The CPU 131 may also acquire the present area information from a GPS (Global Positioning System) information received by GPS receiving section (not shown). Thus, the CPU functions as the determination-information acquiring means by executing the area-information acquiring program 135c.

The weather-information acquiring information 135d is a program for making the CPU 131 have a function to acquire the weather information.

Specifically, the CPU 131 acquires, in a predetermined timing (e.g. every five minutes), the present weather information contained in the data stream, when the item of "Weather" on the reservation configuring screen is selected by the user and a reservation for conducting the channel scanning in response to the transmission condition by weather is made and configured. The CPU 131 may also acquire the weather information in the present area by identifying where the present area is, based on the area selected by the user through, for example, a menu screen, and address information such as an address, a ZIP code, and a telephone number inputted by the user. Further, the CPU may acquire the weather information in the present area based on the area information acquired from GPS information. Thus, the CPU functions as the determination-information acquiring means by executing the weather-information acquiring program 135d.

The determining program is a program for making the CPU 131 have a function to determine whether or not the transmission condition of the transmission path that transmits the broadcasting signal varied, based on the determination information obtained by the execution of the time-information acquiring program 135b, the area-information acquiring program 135c, or the weather-information acquiring program 135d. The determination information is, for example, the time information, the area information, and the weather information. The CPU 131 determines that the transmission condition of the transmission path has varied in the case that the time based on the time information obtained by the execution of the time-information acquiring program 135b has become a predetermined configured time; that the area based on the area information obtained by the execution of the area-information acquiring program 135c has changed from one area to another area; and that the weather based on the weather information obtained by the execution of the weather-information acquiring program 135d has changed from one weather condition to another weather condition.

The CPU 131, thus, constructs the determining means by executing such a determining program 135e.

The process conducted by the CPU 131 in the execution of the determining program 135e will be more specifically explained hereinafter.

For example, the CPU 131 determines that the transmission condition of the transmission path has varied when the time based on the time information obtained by the execution of the time-information acquiring program 135b has become a predetermined configured time, in the case that the item "Time" on the reservation configuring screen is selected by the user and a reservation for conducting the channel scanning in response to the transmission condition by time is made and configured.

Here, the predetermined configured time is the time for conducting the channel scanning process (e.g. the first time of day and the second time of day) configured by the user through the reservation configuring screen G1 displayed on the display section 11 upon the execution of the channel-scanning reservation configuring program 135a. For example, 6:00 a.m. (six o' clock in the morning) as the first time of day and 20:00 p.m. (eight o' clock in the afternoon) as the second time of day (refer to FIG. 3). That is, the CPU 131 detects the present time of day by the execution of the time-information acquiring program 135b; ascertains whether the detected present time is either 6:00 a.m. or 20:00 p.m.; and determines that the transmission condition has not changed if the CPU ascertained that the present time of day was not either of 6:00 a.m. and 10:00 p.m., and that the transmission condition has changed if the CPU ascertained that the present time of day was either of 6:00 a.m. and 10:00 p.m.

The CPU 131 determines that the transmission condition of the transmission path has varied when the present area based on the area information obtained by the execution of the area-information acquiring program 135c changed from one area to another area, in the case that the item of "Area" on the reservation configuring screen is selected by the user and a reservation for conducting the channel scanning process in response to the transmission condition by area is made and configured.

Here, the term "changed from one area to another area" means that, for example, the present area has come to be different from the area where the previous channel scanning was conducted. That is, the CPU ascertains, when it detects the present area based on the area information obtained by the execution of the area-information acquiring program 135c, whether the present area (e.g. the Kinki region) is different from the area where the previous channel scanning process was conducted; and determines that the transmission condition has not changed if it ascertained that the present area was the same area where the previous channel scanning was conducted, and that the transmission condition has changed if it ascertained that the present area was different from the area (e.g. the Central region) where the previous channel scanning was conducted.

The CPU 131 determines that the transmission condition of the transmission path varied when the present weather based on the weather information obtained by the execution of the weather-information acquiring program 135d changed from one weather condition to another weather condition, in the case that the item of "weather" on the reservation configuring screen is selected by the user and a reservation for conducting the channel scanning process in response to the transmission condition by weather is made and configured.

Here, the term "changed from one weather to another weather" means that, for example, the present weather has come to be different from the weather when the previous channel scanning was conducted. That is, the CPU ascertains, when it detects the present weather based on the weather information obtained by the execution of the weather-information acquiring program 135c, whether the present weather (e.g. fair weather) is different from the weather when the previous channel scanning was conducted; and determines that the transmission condition has not changed if it ascertained that the present weather was the same as the weather when the previous channel scanning was conducted, and that the transmission condition has changed if it ascertained that the present weather was different from the weather (e.g. rain) when the previous channel scanning was conducted.

The detecting program 135*f* is a program for making the CPU 131 have a function for detecting receivable channels by conducting the automatic channel scanning process when the transmission condition is determined to have varied by the execution of the determining program 135*e*. The automatic scanning process for the channels is conducted only for the search channels corresponding to the respective transmission conditions of the transmission path, which are stored in the channel memory (by time) 1342, the channel memory (by area) 1343, or the channel memory (by weather) 1344.

Specifically, when the CPU 131 determines, by the execution of the determination program 135*e*, that the transmission condition has varied, the CPU 131 outputs an instruction signal to the tuner 3 to make the tuner 3 tune in sequentially on the search channels within a predetermined frequency band, and conducts the channel scanning process for detecting the channels, from among the search channels, of which broadcasting signals are receivable.

Thus the CPU functions, by executing the detecting program 135*f*, as a detecting means.

The renewing program 135*g* is a program for making the CPU 131 have a function for renewing, based on the detected results obtained by the execution of the detecting program 135*f*, the channel information corresponding to the channel conditions of the transmission path, which is stored in the channel memory (by time) 1342, the channel memory (by area) 1343, or the channel memory (by weather) 1344.

Specifically, the CPU 131 detects, by the execution of the channel detecting program 135*f* for the search channels, whether the broadcasting signals of those channels are receivable; and, if receivable channels are detected from among the search channels, ascertains whether those receivable channels are registered as "Reception/Yes" ((i.e. as receivable channels) on the tables (i.e. such as the first time table 1342*a*, the second time table 1342*b*, the first area table 1343*a* through the eighth area table 1343*h*, and the first weather table 1344*a* through the fourth weather table 1344*d*) in which the channel information corresponding to the transmission conditions of the transmission paths at the present location is stored; and, if those channels are not registered as "Reception/Yes", then registers those channels as "Reception/Yes". If un-receivable channels are detected from among the search channels, the CPU ascertains whether those unreceivable channels are registered as "Reception/Yes" on such tables in which the channel information corresponding to the transmission conditions of the transmission paths at the present location is stored; and, if those channels are registered as "Reception/Yes", then register those channels as "Reception/No" (i.e. as unreceivable channels).

Thus, the CPU functions, by executing the renewing program 135*g*, as a renewing means.

Processes conducted by the CPU in connection with the execution of detecting program 135*f* and the renewing program 135*g* will be more specifically explained hereinafter.

In the case that a reservation for conducting the channel scanning process in response to the transmission condition which varies depending on the time of day is made and configured by the user who has selected the item of "Time" on the reservation configuring screen G1 and the time based on the time information obtained by the execution of the time-information acquiring program 135*b* has become the time when the channel scanning is to be conducted (for example, 20:00 p.m., which is the second time), the determining program 135*e* is executed and determines that the transmission condition of the transmission path has varied. If the determining program 135*e* determines that the transmission condition has varied, the CPU 131 reads out the table (e.g. the second time table 1342*b*) in which the receivable channels at that time are stored; further reads out the search channels previously identified as the channels which are uncertain whether they can be received (e.g. Channel 3, Channel 5, and Channel 6 in the second time table); and conducts the channel scanning process only for the search channels so read out.

As a result of the execution of the channel scanning process for the search channels (e.g. Channel 3, Channel 5, and Channel 6 in the second time table), if Channel 3 and Channel 6 are detected as the receivable channels, the CPU 131 ascertains whether the Channel 3 and Channel 6 are registered as "Reception/Yes", and, if they are not registered as "Reception/Yes", stores those Channel 3 and Channel 6 as "Reception/Yes". On the other hand, in the case that Channel 5 is detected as an unreceivable channel, the CPU 131 ascertains whether Channel 5 is registered as "Reception/Yes" on the second time table 1342*b*, and, if registered so, renews the second time table 1342*b* by storing "Reception/No" in the item of Channel 5.

The explanation will be made for the channel scanning process conducted by the CPU 131 in the first embodiment, with referring to the flowchart shown in FIG. 4.

In a step S1 (a determination-information acquiring step), the CPU 131 acquires the determination information such as the time information, the area information and the weather information from the data stream or the GPS information. In a step 2 (a determination step), the CPU 131 determines whether the transmission condition of the transmission path has varied, based on the determination information acquired in the step 1, by determining whether the time based on the time information acquired by the execution of the time-information acquiring program 135*b* has become the predetermined time previously configured; whether the present area based on the area information acquired by the execution of the area-information acquiring program 135*c* has come to be different from the area where the previous channel scanning process was conducted; or whether the present weather based on the weather information acquired by the execution of the weather-information acquiring program 135*c* has come to be different from the weather when the previous channel scanning was conducted. If the CPU 131 determines that the transmission condition has not varied (the step S2; No), it determines, at a step S3, whether the predetermined time period has passed, and if it determines that the predetermined time period has passed (the step S3; Yes), then it repeats the same processes with its process returning to the process S1.

On the other hand, if the CPU 131 determines in the step S2 that the transmission condition has varied (the step S2; Yes), it determines, in a step S4, whether a viewing audience is watching a broadcasting program. If the CPU 131 determines in the step S4 that the viewing audience is watching the broadcasting program (the step S4; Yes), it determines whether a predetermined time period has passed, and if it determines that the predetermined time period has passed (the step S5; Yes), then it repeats the same processes with its process returning to the process S1.

On the other hand, if the CPU 131 determines in the step S4 that the viewing audience is not watching a broadcasting program (the step S4; No), it reads out in a step S6 the table which stores channel information on the channels receivable under the present transmission condition, and further reads out the search channels previously identified as the channels which are uncertain whether they can be received under the present transmission condition (a step S7). The CPU 131 conducts, at a step S8, the channel scanning process only for the search channels so read out, and processes proceed to renewing steps from a step S9 through a step S14. In the step S9, the CPU 131 determines whether the receivable channels have been detected from among the search channels in the channel scanning process conducted in the step S8. If the CPU determines that a receivable channel or channels have not been detected in the step S9, it proceeds with its process to a step S12.

On the other hand, if the CPU 131 determines that one or more receivable channels have been detected from among the search channels (the step S9; Yes), it ascertains whether the receivable channel or channels are registered as "Reception/Yes" in the table in which the channel information on the channels receivable under the present transmission condition is stored (a step S10). If the detected receivable channel or channels are registered as "Reception/Yes" (a step 10; Yes), then the CPU proceed with its process to a step S12. On the other hand, if the detected receivable channel or channels are not registered as "Reception/Yes" (the step 10; No), the CPU stores such detected channel or channels in the table as "Reception/Yes" (a step S11). Subsequently, the CPU determines, in a step S12, whether an unreceivable channel or channels are detected from among the search channels in the channel scanning process in the step S8. If the CPU determines that the unreceivable channel or channels have not been detected in the step S12 (the step S12; No), it terminates the process. On the other hand, if the CPU determines that the unreceivable channel or channels have detected in the step S12 (the step S12; Yes), it determines, in a step S13, whether the detected unreceivable channel or channels are registered in the table as "Reception/Yes". If the CPU 131 determines, in the step S13, that the un-receivable channel or channels are not registered in the table as "Reception/Yes" (the step S13; No), it terminate this process; and, on the other hand, if the CPU 131 determines, in the step S13, that the unreceivable channel or channels are registered in the table as "Reception/Yes" (the step S13; Yes), it renews the table by storing "Reception/No" for such unreceivable channel or channels and terminates the process.

According to the television receiver 100 embodying the invention, the channel information on the receivable channels, as well as predetermined channels by the respective transmission conditions, are stored, by means of the channel memory (by time) 1342, the channel memory (by area) 1343, and the channel memory (by weather) 1344, for each of the the respective predetermined transmission conditions of the transmission paths that transmit broadcasting signals. Further, the determination information for determining the predetermined transmission conditions of the transmission paths that transmit the broadcasting signals is acquired through the execution, by the CPU 131, of the time-information acquiring program 135$b$, the area-information acquiring program 135$c$, and the weather-information acquiring program 135$d$; and whether the transmission conditions varied is determined by the execution of the determining program 135$e$, based on the determination information acquired by the execution of the time-information acquiring program 135$b$, the area-information acquiring program 135$c$, and the weather-information acquiring program 135$d$. If the CPU 131 determines, by the execution of the determining program 135$e$, that the transmission conditions have varied, the automatic channel scanning process is conducted through the execution of the detecting program 135$f$ by the CPU 131, only for the predetermined channels corresponding to the transmission conditions of the transmission paths and stored in the channel memory (by time) 1342, the channel memory (by area), 1343, and the channel memory (by weather) 1344; and the channels containing a receivable broadcasting signal are detected; and, by the execution of the renewing program 135$g$ and based on the detected results obtained by the execution of the detecting program 135$f$, the channel information corresponding to the transmission conditions of the transmission paths and stored in the channel memory (by time) 1342, the channel memory (by area) 1343, and the channel memory (by weather) 1344 is renewed. The determination information includes the time information, the area information, and the weather information, and by the execution of the determining program 135$e$, the transmission condition is determined that it has varied in the case that the time of day based on the time information acquired by the execution of the time-information acquiring program 135$b$ has become the predetermined time previously configured; that the geographic area based on the area information acquired by the execution of the area-information acquiring program 135$c$ varied from one area to another area; and that the weather based on the weather information acquired by the execution of the weather-information acquiring program 135$d$ varied from one weather to another weather.

Accordingly, the channel scanning process is to be conducted only when the transmission conditions have varied, that is, when the time of day has become the predetermined time previously configured, the location of the television receiver 100 has varied from one area to another area, and the weather has varied from one to another. That is, the channel scanning process is to be conducted only when the transmission conditions of the transmission paths have changed and, therefore, the channel scanning process can be conducted in more appropriate timing corresponding to the transmission conditions of the transmission paths. Accordingly, the present invention can provide a broadcast receiving device with an improved usability. Further, as the time period necessary for the channel scanning process may be shortened in the case that the channel scanning process is conducted only for the channels whose receivability is different depending on the transmission conditions, the channel scanning process can be conducted more efficiently.

The Second Embodiment

Now, the explanation will be made for the second embodiment according to the invention, referring to FIG. 5. In the second embodiment, the explanation for the same components as used in the first embodiment is omitted by putting the same reference numerals to those same components.

In this second embodiment, a broadcast receiving device for receiving television broadcasting programs will be explained as a television receiver 200.

The second embodiment of the television receiver 200 enables a channel scanning process to be conducted only when either one of the time, the area, or the weather varied, that is, when the transmission conditions of the transmission paths varied.

Particularly, the second embodiment of the television receiver 200 renews single channel information at each time the channel scanning process is conducted, unlike with the first embodiment in which the channel information is stored by the transmission conditions of the transmission paths. With this manner, the channel scanning process corresponding to respective channel conditions may be conducted without retaining the channel information which corresponds to the respective transmission conditions.

Figure 5A:
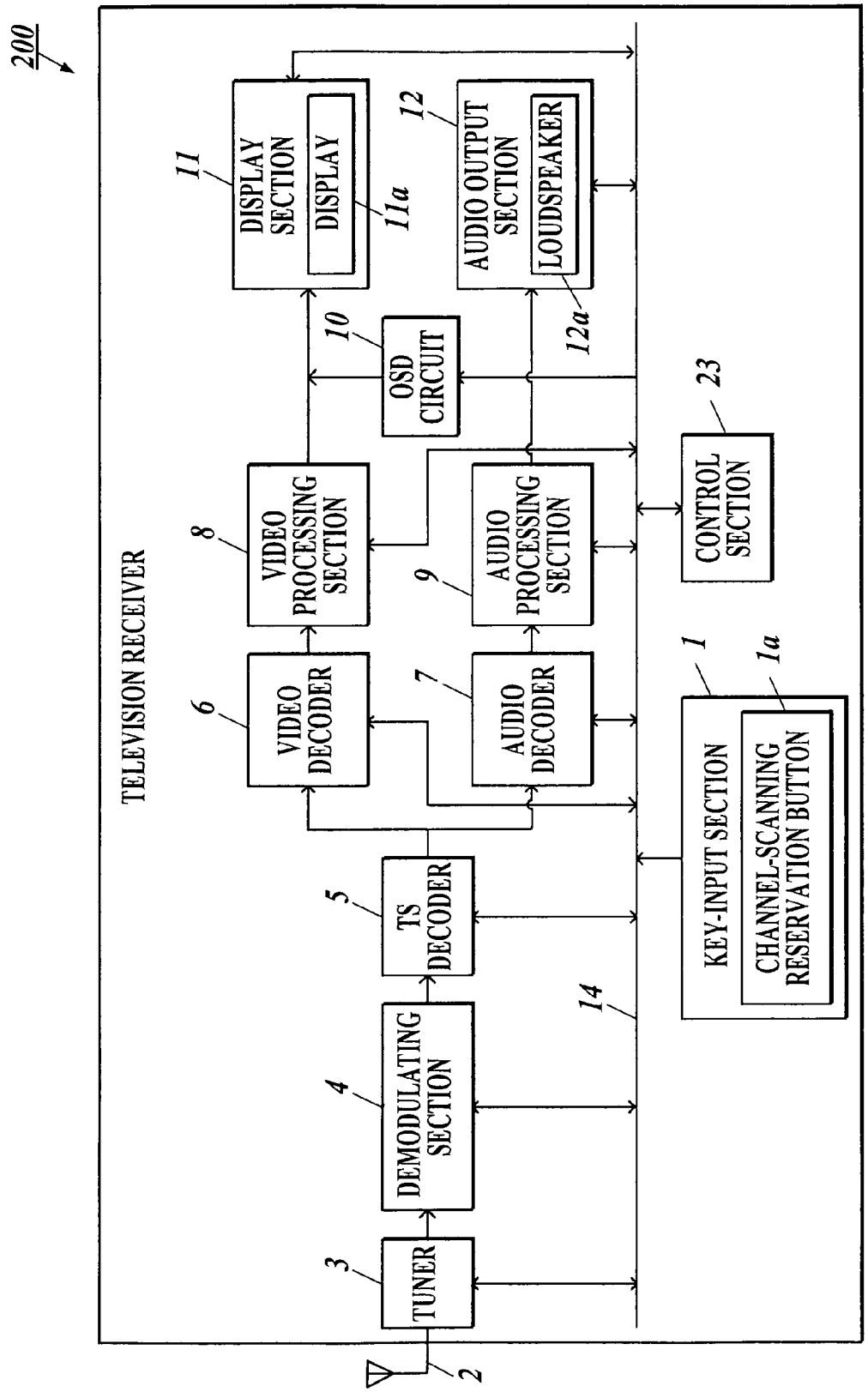

FIG. 5 is a block diagram 200 showing the main construction of the second embodiment of the television receiver 200.

As shown in FIG. 5, the television receiver 200 includes: a key input section as an input means through which a user can remotely input various instructions to the television receiver; an antenna 2 for receiving broadcasting signals; a tuner 3 for tuning in on a broadcasting signal within a predetermined channel among broadcasting signals received by the antenna 2; a demodulating section 4 for demodulating the broadcasting signal tuned in by the tuner 3; a TS decoder 5 for separating the broadcasting signal demodulated by the demodulating section 4 into a plurality of streams; a video decoder 6 and audio decoder 7 for decoding the broadcasting signal separated by the TS decoder 5; a video processing section 8 for performing a predetermined process for a video signal decoded by the video decoder 6; an audio processing section 9 for conducting a predetermined process for an audio signal decoded by the audio decoder 7; an OSD circuit 10 for adding OSD data to the video signal processed by the video processing section 8; a display section 11 for outputting the video signal processed by the video processing section 8; an audio output section 12 for outputting the audio signal processed by the audio processing section 9; and a control section 23 for totally controlling the operation of the television receiver 200; and these components, sections, and units are connected to each other through a bus line 14.

The control section 23 is provided with a CPU 231, a RAM 132, a timepiece unit 133, an EEPROM 34, a ROM 235, and so on.

The CPU 231 executes various programs stored in the ROM 235 in response to input signals inputted from each section of the television receiver 200, and totally controls the overall operation of the television receiver 200.

An EEPROM 234 is, for example, a re-writable semiconductor memory and, specifically, comprises such as a reservation-information storing memory 1341, a channel memory 234a.

The channel memory 234a stores, for example, information on receivable channels, and functions as a memory means.

FIG. 6 shows an example of the channel memory 234a.

As shown in FIG. 6, the channel memory 234a stores broadcasting channels (physical channels) and frequency data of the channel identified by the channel scanning process, with associating the former with the latter. In the item and column indicating "Reception/Yes or No", a receivable channel is stored as "Reception/Yes", and an un-receivable channel is stored as "Reception/No".

The ROM 235 stores, in addition to various data processing programs to be executed by the CPU 231, various initial configuration data (values) relating to those data processing programs. Specifically, the ROM 235 stores a control programs, such as a channel-scanning reservation configuring program 135a, a time-information acquiring program 135b, an area-information acquiring program 135c, a weather-information acquiring program 135e, a determination program 235e, a detecting program 235f, and a renewing program 235g.

The detecting program 235f is a program for making the CPU 231 have a function for detecting receivable channels by conducting the automatic channel scanning process when the transmission condition is determined that it has varied by the execution of the determining program 235e.

Specifically, when the CPU 231 determines, by the execution of the determining program 235e, that the transmission condition has varied, the CPU 231 outputs an instruction signal to the tuner 3 to make the tuner 3 tune in sequentially on the channels within a predetermined frequency band, and conducts the channel scanning process for detecting the channels of which broadcasting signals are receivable.

Thus the CPU functions, by executing the detecting program 235f, as a detecting means.

The renewing program 235g is, for example, a program for making the CPU 231 have a function for renewing the channel information, based on the detected results obtained by the execution of the detecting program 235f.

specifically, the CPU 231 detects, by the execution of the channel detecting program 235f for the predetermined channels, whether the broadcasting signals of those channels are receivable; and, if receivable channels are detected, then registers those channels as "Reception/Yes". If unreceivable channels are detected, then the CPU 231 registers those channels as "Reception/No".

Thus, the CPU 231 functions, by executing the renewing program 235g, as a renewing means.

Processes conducted by the CPU 231 in connection with the execution of the detecting program 235f and the renewing program 235g will be more specifically explained hereinafter.

For example, in the case that the item of "Area" on the reservation configuring screen G1 is selected by a user; and that a reservation for conducting the channel scanning process in response to the transmission condition which varies by area is made and configured; and if it is determined, by the execution of the determining program 235e, that the transmission condition varied due to the reason that the area based on the area information acquired by the execution of the area-information acquiring program 135c is different from the area where the channel scanning process was previously conducted; then the CPU 231 conducts the channel scanning process for the channels in a predetermined frequency band (e.g. Channel "1" through Channel "62"). If the receivable channels are detected by conducting the channel scanning process for the channels (e.g. "1" through "62") in the predetermined frequency band as targets for a search, the CPU 231 stores the item of "Reception/Yes or No" in the channel memory 234a of those receivable channels as "Reception/Yes". On the other hand, if unreceivable channels are detected, the CPU 231 stores those unreceivable channels as "Reception/No" in the item of "Reception/Yes or No" in the channel memory 234a of.

The explanation will be made for the channel scanning process conducted by the CPU 231 in the second embodiment, referring to the flowchart shown in FIG. 7.

In a step S21 (a determination-information acquiring step), the CPU 231 acquires the determination information such as the time information, the area information and the weather information from the data stream, the GPS information, or any other sources. In a step 2 (a determination step), the CPU 131 determines whether the transmission condition of the transmission path has varied, based on the determination information acquired in the step 21, by determining whether the time based on the time information acquired by the execution of the time-information acquiring program 135b has become the predetermined time previously configured; whether the present area based on the area information-acquired by the execution of the area-information acquiring program 135c has come to be different from the area where the previous channel scanning was conducted; or whether the present weather based on the weather information acquired by the execution of the weather-information acquiring program 135c has come to be different from the weather when the previous channel scanning was conducted. If the CPU 231 determines that the transmission condition has not varied (the step S22; No), it determines, at a step S23, whether the predetermined time period has passed, and if it determines that the predetermined time period has passed (the step S23; Yes), then it repeats the same processes with its process returning to the process S1.

On the other hand, if the CPU 231 has determined in the step S22 that the transmission condition has varied (the step S22; Yes), it determines, in a step S24, whether a viewing audience is watching a broadcasting program. If the CPU 231 has determined in the step S24 that the viewing audience is watching the broadcasting program (the step S24; Yes), it determines whether a predetermined time period has passed, and if it determines that the predetermined time period has passed (the step S25; Yes), then it repeats the same processes with its process returning to the process S21.

On the other hand, if the CPU 231 determines in the step S24 that the viewing audience is not watching a broadcasting program (the step S24; No), it conducts, at a step S26, the channel scanning process for the channels in a predetermined frequency band as targets for a search, and processes proceed to renewing steps from a step S27 through a step S30. In the step S27, the CPU 231 determines whether the receivable channels have been detected in the channel scanning process conducted in the step S26. If the CPU 231 determines that a receivable channel or channels have not been detected in the step S27, it proceeds with its process to a step S29.

On the other hand, if the CPU 231 determines in the step S27 that one or more receivable channels have been detected from among the channels in a predetermined frequency band (the step S27; Yes), then it stores such a detected channel or channels in the channel memory 234a as "Reception/Yes". Subsequently, the CPU 231 determines in a step S29 whether an unreceivable channel or channels are detected in the channel scanning process in the step S26. If the CPU determines that the unreceivable channel or channels have not been detected in the step S29 (the step S29; No), it terminates the process. On the other hand, if the CPU 231 determines that the unreceivable channel or channels have been detected (the step S29; Yes), it stores such a detected unreceivable channel or channels in the channel memory 234a as "Reception/No" thereby renewing the channel memory 234a, and terminates the process.

According to the second embodiment of the television receiver 200 described above, the channel information on the receivable channels is stored in the channel memory 234; the determination information for determining predetermined transmission-conditions of the transmission paths that transmit the broadcasting signals is acquired through the execution, by the CPU 131, of the time-information acquiring program 135b, the area-information acquiring program 135c, and the weather-information acquiring program 135d; and whether the transmission conditions have varied is determined by the execution of the determining program 135e, based on the determination information acquired by the execution of the time-information acquiring program 135b, the area-information acquiring program 135c, and the weather-information acquiring program 135d. If the CPU 231 determines, by the execution of the determining program 235e, that the transmission conditions have varied, the automatic channel scanning process is conducted through the execution of the detecting program 235f by the CPU 231, for the channels in a predetermined frequency band; the channels containing a receivable broadcasting signal are detected; and, by the execution of the renewing program 235g and based on the detected results obtained by the execution of the detecting program 235f, the channel information corresponding to the transmission conditions of the transmission paths and stored in the channel memory 234 is renewed. Further, the determination information includes the time information, the area information, and the weather information, and by the execution of the determining program 235e, it is determined that the transmission condition varied in the case that the time of day based on the time information acquired by the execution of the time-information acquiring program 135b has become the predetermined time previously configured; that the geographic area based on the area information acquired by the execution of the area-information acquiring program 135c has varied from one area to another area; and that the weather based on the weather information acquired by the execution of the weather-information acquiring program 135d has varied from one weather to another weather.

Accordingly, the channel scanning process is to be conducted only when the transmission conditions has varied, that is, when the time of day has become the predetermined time previously configured, the location of the television receiver 200 has varied from one place to another place, and the weather has varied from one weather to another weather. That is, the channel scanning process is to be conducted only when the transmission conditions of the transmission paths have changed and, therefore, the channel scanning process can be conducted in more appropriate timing corresponding to the transmission conditions of the transmission paths. Accordingly, the present invention can provide a broadcast receiving device with an improved usability.

It will be evident that the present invention is not limited to the above-described embodiments and various improvements and changes of design may be made to each of the embodiments without departing from the scope of the present invention.

The broadcast receiving device according to the present invention may be constructed, for example, as a device for automobile use.

Figure 4A:
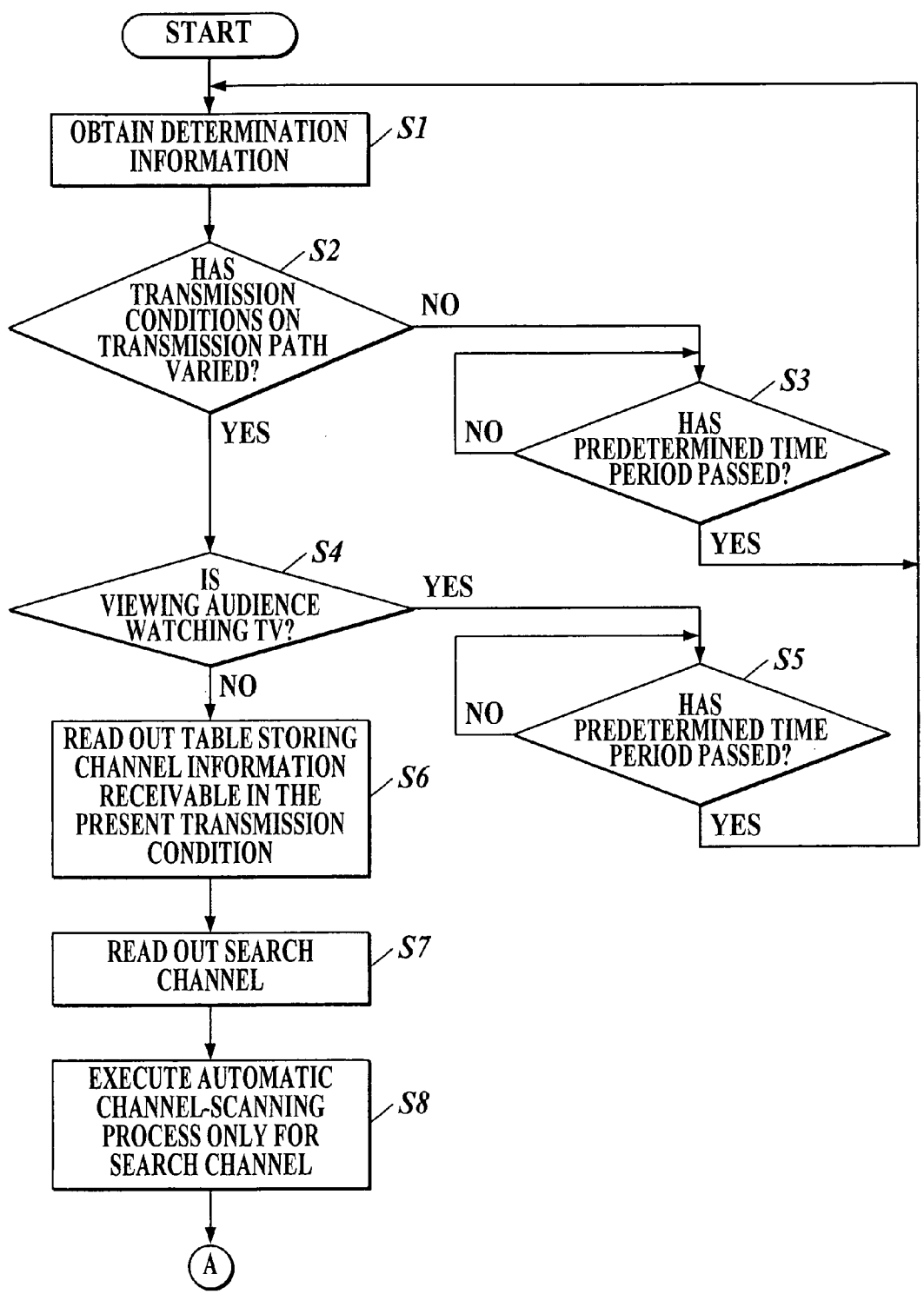
FIGS. 4A and 4B are flowcharts showing a channel scanning processing conducted by a CPU in the first embodiment.
Figure 4B:
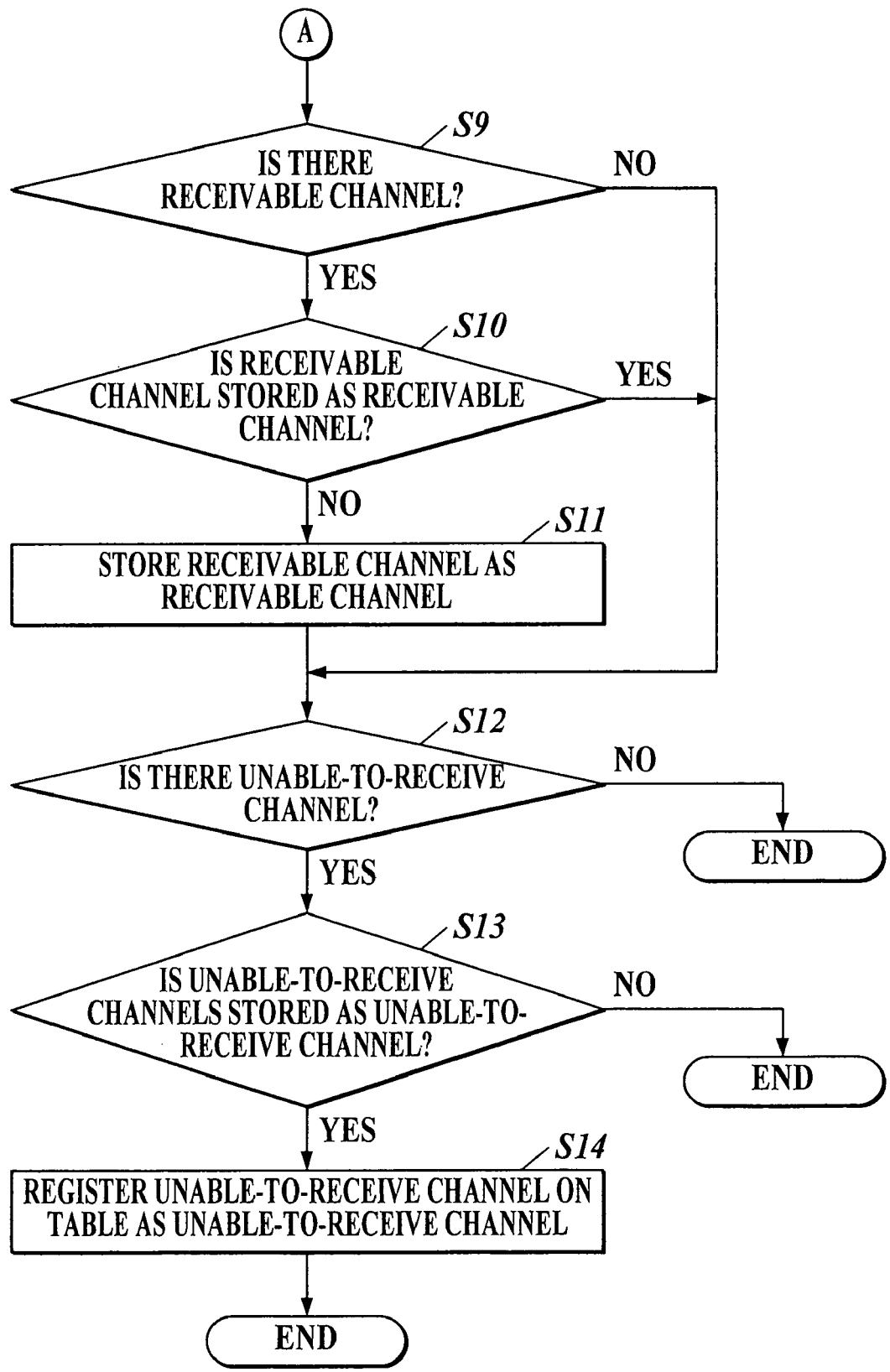

Further, in the case that a plurality of tuners are equipped, the determination as the step S4 in FIG. 4 may not be necessary and the channel scanning process may be conducted regardless of whether a viewing audience is watching a television program.

Furthermore, the broadcast receiving device can be constructed so as not to conduct the automatic channel scanning process until a predetermined time period has passed, even if it is determined that the transmission condition has varied.

Further, factors for determining that the transmission condition has varied may be based on either one of the determination information among the time information, the area information, and the weather information; and a combination of those factors may be used as well for determining whether the transmission condition has varied.

The present U.S. patent application claims a priority under the Paris Convention of Japanese patent application No. 2006-175422 filed on Jun. 26, 2006, and is entitled to the benefit thereof for a basis of correction of an incorrect translation.

What is claimed is:

1. A broadcast receiving device comprising:
a memory unit for storing channel information on a channel for a predetermined transmission condition of a transmission path which transmits a broadcasting signal, the transmission condition indicating one time slot of a day, one area or one weather condition;
a channel memory unit for storing, among the channel, a search channel for the transmission condition, the search channel being automatically identified as uncertain to be receivable under the transmission condition, by conducting an all-channel-subjected channel scanning multiple times under the transmission condition;

a determination-information acquiring unit for acquiring determination information to identify the transmission condition of the transmission path;
a determining unit for determining whether the transmission condition has changed, based on the determination information acquired by the determination-information acquiring unit;
a detecting unit for conducting, when the determining unit determines that the transmission condition has been changed, a search-channel-subjected scanning on the search channel so as to detect a receivable channel among the search channel for the transmission condition; and
a renewing unit for renewing the channel information stored in the memory channel for the transmission condition, based on a result obtained by the detecting unit, wherein
the determination information includes time information, area information, and weather information;
the determining unit determines that the transmission condition has changed when a time based on the time information acquired by the determination-information acquiring unit reaches a preset time, when an area based on the area information acquired by the determination-information acquiring unit is different from a previous area, or when weather based on the weather information acquired by the determination-information acquiring unit is different from previous weather; and
the search channel stored in the channel memory unit remains as the search channel regardless of the result obtained by the detecting unit.

2. A broadcast receiving device comprising:
a memory unit for storing channel information on a channel for a predetermined transmission condition of a transmission path which transmits a broadcasting signal, the transmission condition indicating one time slot of a day, one area or one weather condition;
a determination-information acquiring unit for acquiring determination information to identify the transmission condition of the transmission path;
a determining unit for determining whether the transmission condition has changed, based on the determination information acquired by the determination-information acquiring unit;
a detecting unit for conducting, when the determining unit determines that the transmission condition has changed, a search-channel-subjected scanning on a search channel among the channel for the transmission condition, search channel being automatically identified as uncertain to be receivable under the transmission condition by conducting an all-channel-subjected channel scanning multiple times under the transmission condition, so as to detect a receivable channel among the search channel for the transmission condition; and
a renewing unit for renewing the channel information stored in the memory unit for the transmission condition, based on a result obtained by the detecting unit, wherein the search channel remains as the search channel regardless of the result obtained by the detecting unit.

3. A broadcast receiving device claimed in claim 2, wherein the determination information includes time information; and the determining unit determines that the transmission condition has changed when a time based on the time information acquired by the determination-information acquiring unit reaches a preset time.

4. A broadcast receiving device claimed in claim 2, wherein the determination information includes area information; and the determining unit determines that the transmission condition has changed when an area based on the area information acquired by the determination-information acquiring unit is different from a previous area.

5. A broadcast receiving device claimed in claim 2, wherein the determination information includes weather information; and the determining unit determines that the transmission condition has changed when weather based on the weather information acquired by the determination-information acquiring unit is different from previous weather.

6. A method for renewing channel information on a channel in a broadcast receiving device which comprises a memory unit for storing the channel information for a predetermined transmission condition of a transmission path which transmits a broadcasting signal, the transmission condition indicating one time slot of a day, one area or one weather condition, the method comprising:
a determination-information acquiring step for acquiring determination information to identify the transmission condition of the transmission path;
a determining step for determining whether the transmission condition has changed, based on the determination information acquired in the determination-information acquiring step;
a detecting step for conducting, when the determining step determines that the transmission condition has changed, a search-channel-subjected scanning on a search channel among the channel for the transmission condition, search channel being automatically identified as uncertain to be receivable under the transmission condition by conducting an all-channel-subjected channel scanning multiple times under the transmission condition, so as to detect a receivable channel among the search channel for the transmission condition; and
a renewing step for renewing the channel information stored in the memory unit for the transmission condition, based on a result obtained in the detecting step, wherein the search channel remains as the search channel regardless of the result obtained in the detecting step.

* * * * *